INVENTOR.
JULIUS W. SANDY
BY PENDLETON, NEUMAN SEIBOLD & WILLIAMS
ATTORNEYS

INVENTOR.
JULIUS W. SANDY
BY PENDLETON, NEUMAN
SEIBOLD & WILLIAMS

ATTORNEYS

United States Patent Office 3,443,509
Patented May 13, 1969

3,443,509
VENDING MACHINE
Julius W. Sandy, Bensenville, Ill., assignor to Microtherm Limited, London, England, a British company
Filed Jan. 25, 1967, Ser. No. 611,605
Int. Cl. A47j 36/24; A47f 1/04
U.S. Cl. 99—357                                12 Claims

ABSTRACT OF THE DISCLOSURE

This disclosure relates to an integrated vending machine having a magazine for storing a plurality of food articles, and a mechanism for quickly heating a food article after selection thereof. A transport assembly is interposed between the magazine and the heating mechanism. The transport assembly includes an inclined ramp, spaced below the magazine, whereby a cylindrical food article, when dropped from the storage area, rolls to the end of the inclined ramp and then slides into the heating mechanism. A pair of parallel walls spaced apart by slightly more than the food articles, keep the food articles in aligned condition while being dropped and while rolling down the ramp.

---

This application relates to an integrated vending machine, and in particular to such a vending machine in which facilities are provided for storing and maintaining food products in a refrigerated or frozen state, and for withdrawing individual ones of the food products from storage, heating such products to eating temperature, and dispensing such products.

One of the principal objects of the present invention is to attain the maximum possible speed in performing the operations of withdrawing a product from a storage magazine, heating it to an eating temperature, and dispensing it to an outlet receptacle. The currently available vending machines, which include a mechanism for heating a refrigerated product to eating temperature, are limited to the use of conveying means which positively conveys a food product from a refrigerated storage magazine to a heating apparatus. The positive conveying means is necessary in order to retain control of the attitude of the food products during the conveying operations, and during the heating operation, as the product must be loaded into the heating apparatus in a particular attitude. The requirement for a positive conveying system has resulted in a relatively slow operation for these vending machines, because it takes a great deal of time to convey a food product from the storage magazine to the heating apparatus. Accordingly, it is an object of the present invention to provide an improved conveying apparatus which decreases the amount of time required to convey the food product from the magazine to the heating apparatus.

The heating of the food products, in previous vending machines has also been relatively slow, in that slow acting thermal or infra-red heating measures have been employed. In the present invention, the heating apparatus employs microwave radiation to heat the products, which takes only a matter of seconds.

Accordingly, it is one object of the present invention to provide an integrated vending machine with the capacity for storing food products at a refrigerated temperature, and for heating said products to eating temperature in a very short time.

It is another object of the present invention to provide means for conveying food products from a magazine to a heating apparatus in a minimum amount of time.

Another object of the present invention is to provide an integrated vending machine, employing a microwave oven for heating food products to an elevated eating temperature It is a further object of the present invention to provide such a microwave oven with means for automatically sealing the oven against emission of microwave radiation, and means for automatically opening first one end of the oven and then the other in order to permit a food product to pass into the oven through one end and out of the oven through the other end.

It is another object of the present invention to provide such a microwave oven, including means for opening the lower end of the oven to permit a food product to be ejected from the oven by gravity, and means for holding said product in the oven until the sealing means at the lower end has been displaced from alignment with the path of travel of said product.

These and other objects of the present invention will become manifest upon an examination of the following specification and the accompanying drawings, in which.

Figure 1:
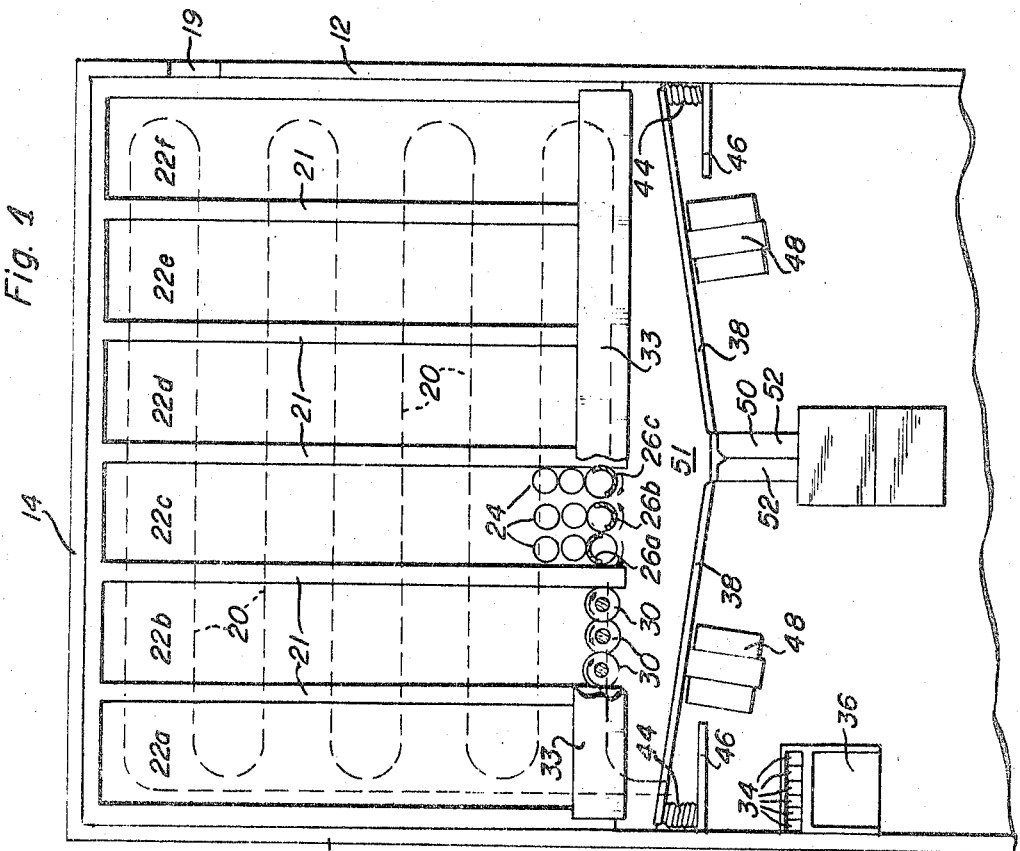
FIG. 1 is a front elevation, partly in cross section and partly broken away, of an integrated vending machine incorporating an illusrative embodiment of the present invention.

Referring now to FIG. 1, the general organization of the integrated vending machine is illustrated. The machine comprises a cabinet having sidewalls 10 and 12 and a top wall 14. The back of the cabinet is closed with a wall 16 (FIG. 2) and a front cover 18, which is hinged at 19, so that the front of the vending machine may be opened, when desired, for loading. The upper portion of the cabinet is refrigerated by a refrigerator coil 20 disposed near the back wall 16 of the cabinet, which coil 20 is connected to a conventional compressor and condenser (not shown). The upper portion of the cabinet comprises a magazine for storing a number of food products in containers 24, which preferably are sandwiches or the like The magazine is made up of six individual columns, 22a through 22f, defined and separated by a number of vertical walls 21, and each of the columns 22 is adapted to store a plurality of layers of containers 24, as illustrated in column 22c in FIG. 1. Each layer is made up of three of the containers 24, an a number of layers may be stacked in each column 22 so that each compartment is substantially completely full of containers 24, each containing a food product. As will be described in more detail hereinafter, the containers 24 are conveyed from the columns 22 by gravity, and the lowest position in each of the magazine columns 22 is fed out first. As the containers 24 in the lower layer are fed out, the remaining containers 24 proceed downwardly in the appropriate column 22, leaving a space which is filled periodically with new containers, loaded manually from the top of the columns 22, so that the order of selection of the containers 24 from the magazine is first-in-first-out.

At the bottom of each column 22 are three cup-like members 26a through 26c (illustrated in column 22c of FIG. 1, where the front part of the assembly is broken away). Each of the cups 26 is in the form of a semicylindrical shell. The cups 26 are shaped so that each holds a single one of the containers 24. Each of the cups 26 is mounted on a shaft 28 (FIG. 2) and a gear 30 is mounted on each shaft 28 and meshes with the adjacent gears 30, as illustrated in column 22b, where the part of the assembly in front of the gears 30 is broken away. One of the shafts 28 is driven by a motor 32 (FIG. 2), and by virtue of the gears 30, the cups 26 of any one column all rotate together. Each column 22 has its own motor 32, whereby the cups 26 of each column may be rotated separately.

As illustrated in FIG. 1, the open side of the cups 26 are phased so that as the three cups are rotated by the motor 32 (cup 26b rotating oppositely relative to the other two) they will drop their three containers 24 in sequence, the containers dropping when the open side of the cups 26 are pointing downwardly, in which the cup 26a is illustrated. When a cup 26 opens downward, the product is delivered by gravity out of the magazine, and when the cup 26 rotates further so that it opens upward, the empty cup 26 accepts another container 24 from the next higher layer within its column 22. It will thus be seen that for each 120° rotation of the shafts 28, one food product, in a container 24, is fed from the magazine.

Figure 2:
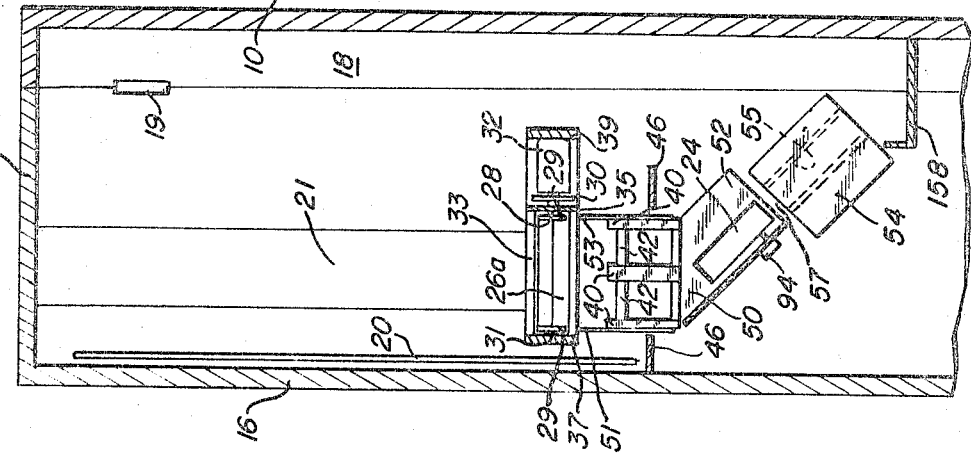
FIG. 2 is a side elevation, partly in cross section, of the apparatus of FIG. 1.

The cups 26 each have circular end walls 27 and 29. The end walls 27 are each connected to one of the shafts 28, and the end walls 29 are each connected to a shaft 31. A frame 33 (FIG. 2) connected to the walls 21, has a pair of walls 35 and 37, in which the shafts 28 and 31 are journaled to support the cups 26. A third wall 39 of the frame 33 supports the motors 32, one of which is illustrated in FIG. 2.

Each of the six columns 22 is provided with a separate actuating motor 32. The apparatus for each column 22 is identical and therefore all of the columns are adapted to discharge their containers 24 individually, whenever their actuating motors 32 are energized. In its intended manner of use, each column 22 of the machine is filled with a different kind of food product, and one of the columns 22 is selected by energizing the motor 32 associated with that column. The motor selection is under the control of switches 34 mounted on the front panel of the machine. A coin-receiving mechanism 36 also controls the operation of the machine so that no motor 32 can be selected until an appropriate amount of money has been inserted into the machine.

The containers 24 issuing from the cups 26 of the compartments 22, fall by gravity onto one of two ramps 38, located on both sides of the center of the machine, and the two ramps 38 slope inwardly toward the center. Each ramp is formed of three parallel bars 40, interconnected by rods 42 at each end and supported at each end by springs 44 from a shelf 46, secured to the rear panel 16 of the machine. Two vibrator units 48 are secured to the central portion of the ramps 38 so that both of the ramps 38 are subjected to vibration. The springs 44 insulate the vibration from the remainder of the machine. Walls 51 and 53, secured at their ends to the sidewalls 10 and 12, are spaced apart by slightly more than the length of the containers 24, to prevent the same from twisting as they roll down the ramps 38.

The inner (and lower) ends of the ramps 38 terminate short of each other, and a chute 50 is disposed between and just below, the inner ends of the ramps. The chute 50 is in the form of a V, formed by two inclined side panels 52. A microwave oven 54 is mounted relative to the chute 50 so that a container 24 slides down the chute 50 into a circular cylindrical oven chamber 55, within the oven 54.

Figure 5:
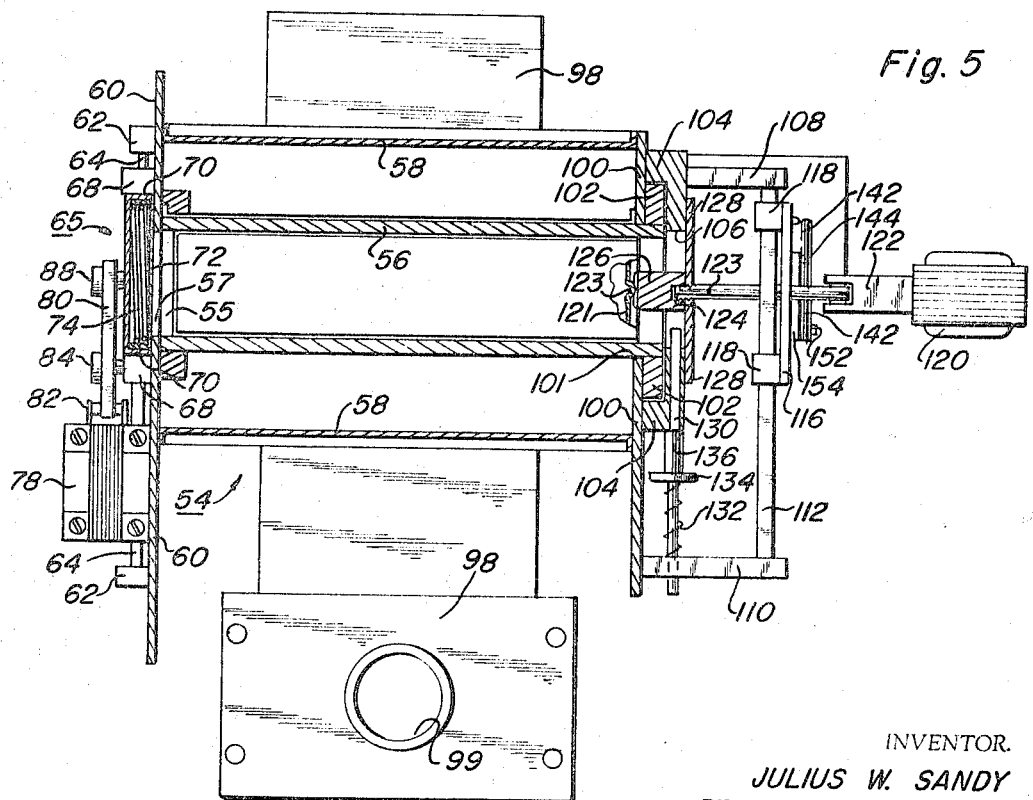
FIG. 5 is a side elevation, partly in cross section, of the microwave oven illustrated in FIGS. 3 and 4.

Referring now to FIG. 5, a cross-sectional view of the microwave oven is illustrated, including the circular cylindrical heating chamber 55 within the oven, accessible through the opening 57. The microwave oven is of the general type illustrated and described in my copending application Ser. No. 404,770 filed Oct. 19, 1964, now Patent No. 3,289,570, for Microwave Oven. Certain modifications of that oven have been made to adapt it especially for use in an integrated vending machine, however, and those modifications will now be described.

The oven has an outer housing 58 in the form of a rectangular parallelopiped, having conductive walls. The top wall 60 is illustrated in plan view in FIG. 3. A pair of brackets 62, secured to the top wall 60, support a pair of rods 64 extending parallelly with the top wall 60, and parallelly with each other. The two rods 64 comprise a pair of rails upon which the door unit 65 is slidably mounted.

A cross-sectional view of the door unit 65 is illustrated in FIG. 5. The top plate 66 of the door unit 65 is provided with slides 68, each of which encircle its rail 64, and support the plate 66 in fixed position relative to the top wall 60 of the oven 54. The inner surface of the plate 66 is provided with inwardly extending flanges 70, thereby forming an inwardly opening cup. Within the cup is an inner cup 72, which is an integrated cup having the same general shape as the cup formed by the flanged plate 66. A spring 74 is trapped between the plate 66 and the spring 74 urges the cup 72 tightly into sliding contact with the top wall 60 of the oven 54. The surface of the inner cup 72, which closes the opening 57 in the top wall 60, is perfectly smooth and flat so that a metal to metal seal is effected around the opening, and no microwave radiation can escape when the door is in closed position, illustrated in FIG. 3.

A bracket 76 is mounted to the top wall 60, and supports a solenoid 78. The solenoid 78 has a link 80 pivotally connected to its armature by a pin 82 and pivotally mounted with respect to the top wall 60 by a pin 84. The opposite end of the link 80 is provided with a slot 86, within which a rivet 88 mounted to the upper plate 66 of the door is slidably disposed. When the solenoid 78 is in its actuating condition, illustrated in FIG. 3, the door 65 is moved on the rail 64 to its closed position. When the solenoid 78 is deactuated, however, a spring 96, which interconnects the armature of the solenoid 78 with a pin 92 secured to the top wall 60 of the oven 54, urges the link 80 to move counterclockwise, as viewed in FIG. 3, thereby sliding the door 65 on the rails 64 to its open position. The door 65 is normally in its open position, for the solenoid 78 is normally not actuated. Thus, when a container 24 is selected by the switches 74, the door 65 is open, and the container 24 rolls down one of the ramps 38, slides through the chute 50 and enters the open door of the oven 54 into the chamber 55.

When the container 24 passes through the chute 50, it trips a microswitch 94. Actuation of the microswitch 94 indicates that a container 24 is in the chute 50, and subsequent deactuation of the microswitch 94 indicates that the container 24 has passed into the oven 54.

Figure 3:
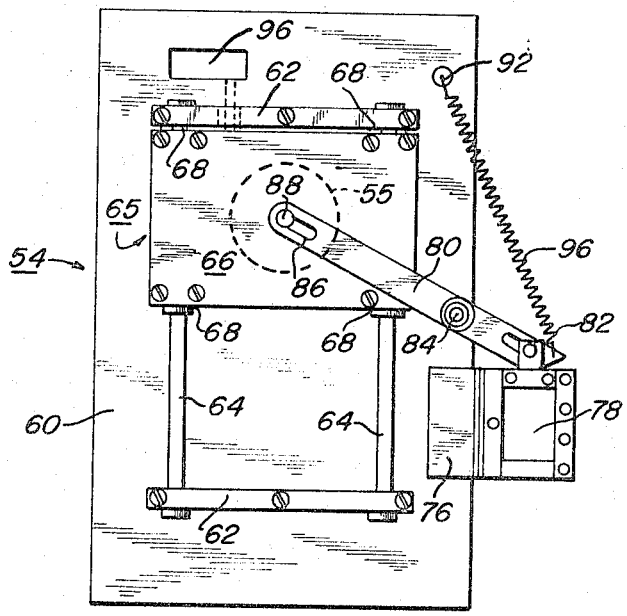
FIG. 3 is a plan view of the top of the microwave oven unit illustrated in diagrammatic form in FIGS. 1 and 2.

A second microswitch 96 is mounted on the top wall 60 of the oven 54, and is actuated when the door 66 is in its closed position, as illustrated in FIG. 3. The switches 94 and 96 jointly indicate that a container 24 has passed into the oven 54, and that the door has been closed. The food product within the container 24 is then ready to be warmed by the application of microwave energy to the oven, through a waveguide 98 (FIG. 5), and this is accomplished automatically as soon as the switch 96 has been closed.

A timer (not shown) is associated with the source of microwave energy, connected to the waveguide 98 at aperture 99, so that after the energy has been applied for a predetermined period of time, the timer automatically shuts off the microwave source. The length of the heating period is chosen so that the product within the container 24 has been fully heated at the end of the period.

In FIG. 5, all of the moving parts of the assembly are illustrated in their normal condition, i.e., the position occupied prior to actuation of the machine by one of the switches 34.

Figure 4:
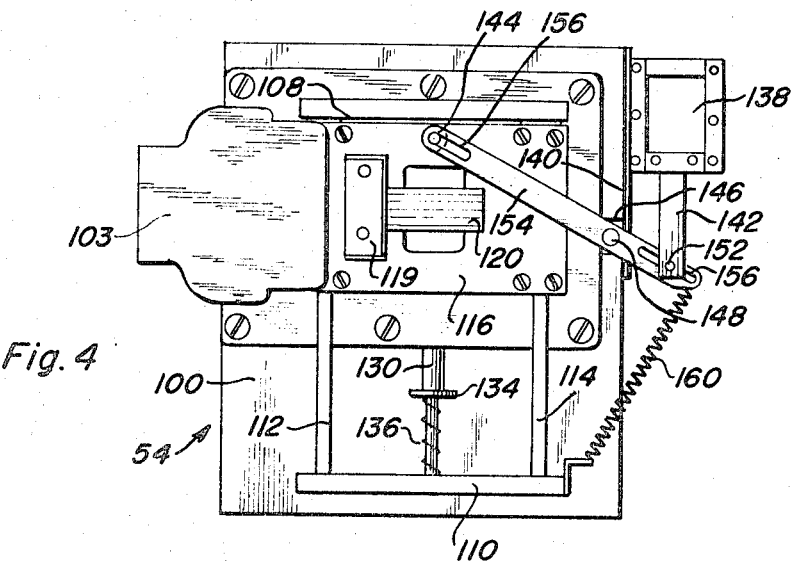
FIG. 4 is a plan view of the bottom of the microwave oven of FIG. 3.

The bottom wall 100 of the oven 54 has an aperture 101 through which the tubular sleeve 56, which defines the heating chamber 55, extends. A ring gear 102 is secured to the end of the tube 56, which enables the tube 56 to be rotated during the heating portion of each cycle of operation, as more fully explained in my aforementioned copending application Ser. No. 404,770. A motor 103 for accomplishing this is mounted on the bottom wall 100 and is illustrated in FIG. 4. A conducting block 104 surrounds the periphery of the gear 102, and contacts the wall 100 to prevent any leakage of microwave radiation. An aperture 106, aligned with the heating chamber defined by the tube 56, is provided in the block 104, and it is through this aperture that the container 24 passes from the oven.

As illustrated in FIG. 5, an upper bracket 108 and a lower bracket 110 are secured, respectively, to the block 104 and the bottom wall 100. A pair of rails 112 and 114 (FIG. 4) are secured in spaced parallel relation between the brackets 108 and 110. The rails 112 and 114 are spaced substantially further from the bottom wall 100 than are the rails 64, relative to the top wall 60, in order to accommodate additional structure associated with the bottom opening of the oven.

A platform 116 is provided with guides 118 which surround the rails 112 and 114 to permit the platform 116 to slide on the rails 112 and 114 in a direction parallel with the surface of the end wall 100.

A bracket 119 (FIGS. 4 and 5) is bolted to the outer surface of the platform 116, and extends outwardly therefrom. A solenoid 120 is secured to the outer end of the bracket 118, and its actuator 122 is aligned coaxially with the heating chamber 55. The actuator 122 is connected to a shaft 123, which extends through an aperture of the platform 116, and terminates in a threaded end 124. The end 124 is received in a bore having corresponding threads within a plunger 126, and a washer 128 is mounted between the plunger 126 and the actuator shaft 122. The circular washer 128 is adapted to cooperate with the outer surface of the block 104 to provide a metal to metal seal extending continuously around the closing aperture 106. The plunger 126 protrudes into the heating chamber 55, and determines the position of the bottom of the container 24, when it is within the heating chamber 55. The plunger 126 is formed of material having low dielectric losses at the microwave frequency employed, such as nylon, and has a length which is just sufficient to keep the container 24 centrally disposed within the heating chamber 55 when the solenoid 120 is in its unactuated position, as illustrated in FIG. 5. An end cap 121 of the container 24 is shown in cross section in FIG. 5, illustrating a protuberance 123 at the center of the end cap 121, which bears against the plunger 126.

At the termination of the heating cycle, the solenoid 120 is actuated to withdraw the shaft 123 outwardly, and retract the washer 128 against the inner surface of the guide members 118. This withdraws the plunger 126 from within the heating chamber 55, but the container 24 is restrained from leaving the heating chamber by a pin 130, slidably disposed in a bore in the block 104 and urged inwardly by a spring 132 disposed between the bracket 110 and a flange 134 on the pin 130. A shoulder 136 on the pin 130 engages the outer surface of the block 104 to prevent the pin 130 from contacting the plunger 126.

Figure 6:
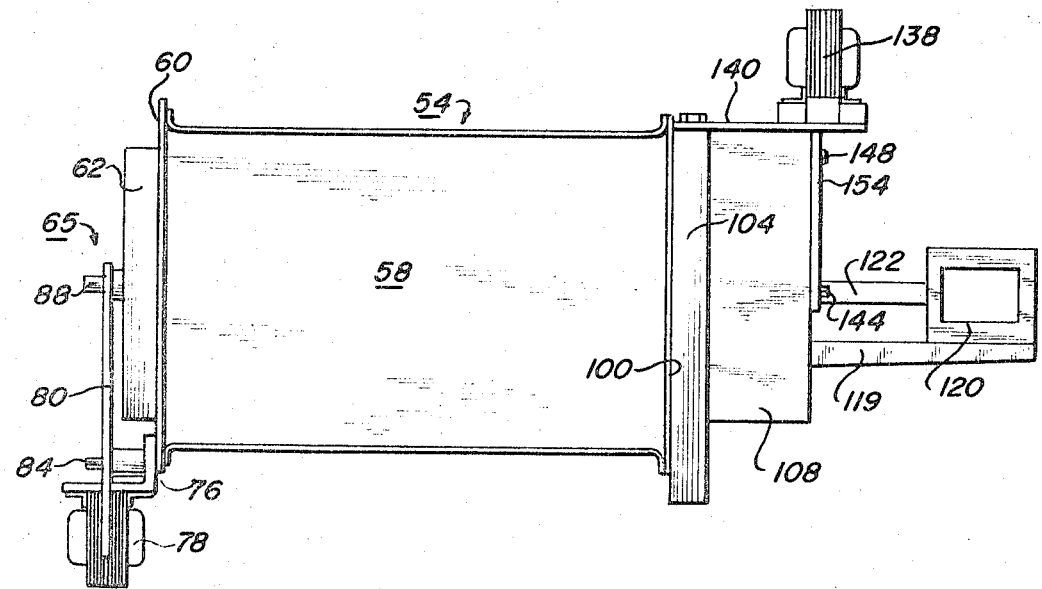
FIG. 6 is another side elevation of the microwave oven illustrated in FIGS. 3, 4 and 5.

When the solenoid 120 has withdrawn the plunger 126 completely from the heating chamber 55, another solenoid 138 (FIGS. 4 and 6) is energized, which operates to move the platform 116 on the guide rods 112 and 114 from out of alignment with the aperture 106.

A bracket 140 is mounted on the side of the block 104 and extends outwardly from the oven 54. The solenoid 138 is mounted on the bracket 140, and its armature 142 is movable in a plane spaced slightly from the outer surface of the platform 116.

A pin 144 is secured to the outer surface of the platform 116. The outer edge of the bracket 140 is provided with a tab 146 extending at a right angle therefrom, and a pin 148 is mounted therein. The armature 142 of the solenoid 138 is pinned (by a pin 152) to one end of a link 154 rotatably mounted on the pin 148, and the other end of the link 154 is in engagement with the pin 144. A slot 156 is provided at each end of the link 154, and the pins 144 and 152 engage the link 154 within the slots 156.

When the solenoid 138 is actuated, the link 154 is rotated counterclockwise as viewed in FIG. 4, and the platform 116 is slid downwardly as on the guides 112 and 114.

As has been described above, the container 24 is retained within the heating chamber 55 by the pin 130 (FIG. 5) which continues to block the container 24 until the platform 116 has been moved away from alignment with the aperture 106, in a downward direction as viewed in FIG. 5. After the platform 116 is free of the aperture 106, the plunger 126 engages the flange 134 of the pin 130, and pushes it downwardly as viewed in FIG. 5, thereby retracting the pin 130 from the aperture 106. At the completion of the stroke of the solenoid 138, the pin 130 is entirely withdrawn, and the container 24 can proceed out of the oven 54 into the outlet receptacle 158 (FIG. 2). A spring 160 returns the platform 116 to the position illustrated in FIG. 4 when the solenoid 138 is deactuated, and the subsequent deactuation of the solenoid 120 returns the flange 128 to sealing engagement with the block 104 as illustrated in FIG. 5. In addition, the deactuation of the solenoid 78 opens the top entrance of the oven 54, in preparation for heating a successive food product 24.

It will be appreciated that the actuation and deactuation of the solenoids 78, 120 and 138 must be in a proper order, under the influence of the microswitch 94, and the timer associated with the magnetron power circuit. However, those skilled in the art are familiar with many ways of bringing about the proper sequencing, such as with motor driven cam switches, for example, and so no particular mode of accomplishing this is described.

By the foregoing, the present invention has been described in such detail as to enable others skilled in the art to make and use the same, and, by applying current knowledge, adapt the same for use under varying conditions of service, without departing from the essential features of novelty thereof, which are intended to be defined and secured by the appended claims.

What is claimed is:

1. In a dispensing apparatus having a magazine for storing a plurality of food products, in individual elongate, cylindrical containers, an oven for heating said food products, and means for delivering said heated food products to an outlet, the combination comprising means for dispensing said containers singly from said magazine whereby said containers fall freely from said magazine into a receiving chamber, said receiving chamber being defined by a pair of parallel walls, spaced apart by slightly more than the length of said containers and an inclined ramp disposed beneath said magazine between said walls for catching said freely falling containers and permitting them to proceed toward the downward end of said ramp in an oriented condition, and aligning means disposed at the downward end of said ramp for aligning said containers, said oven being disposed adjacent said aligning means and having an entrance opening positioned relative to the orientation of said containers on said aligning means to pass said containers into said oven from said aligning means in a direction transverse to the vertical plane defined by the free fall of said containers and their movement along said ramp, the movement of said containers relative to said aligning means and into said oven being brought about by gravity.

2. Apparatus according to claim 1 wherein said containers are elongate in form, and said aligning means comprises an elongate, inclined, V-shaped guide member whereby said containers are oriented with their long dimensions parallel to the long dimension of said guide member and move longitudinally along said guide member into said oven.

3. Apparatus according to claim 2 wherein said guide member is formed of two intersecting planes, and said oven is inclined at the same angle as said guide member, to permit said containers to move rectilinearly along said guide member into said oven.

4. Apparatus according to claim 2 wherein said guide member is offset from directly below said dispensing means, and said inclined ramp extends from a point below said dispersing means to a lower end near said guide means, whereby said containers are transported to said guide member after their free fall by proceeding down said ramp.

5. Apparatus according to claim 4 wherein said magazine comprises a plurality of columns for storing said containers, and including dispensing means for each said column, all of said dispensing means being disposed above said ramp.

6. Apparatus according to claim 4 wherein said containers are circular cylinders, said ramp is disposed relative to said dispensing means so that said containers roll down said ramp to said guide means, and said guide means is disposed relative to the lower end of said ramp for orienting said containers for longitudinal movement away from the vertcal plane passing through said ramp.

7. Apparatus according to claim 1 wherein said oven comprises an inclined heating chamber which conforms to the size and shape of said containers, said entrance opening being at the upper end of said heating chamber, and means for selectively permitting said containers to slide out of said oven through an exit opening at the lower end of said heating chamber.

8. Apparatus according to claim 1 adapted for dispensing a variety of said food products, wherein said magazine includes a plurality of sections, and said dispensing means includes means for delivering a food product from a selected one of said sections, whereby the selected food product drops from said section, and transfer means for receiving a selected food product from said sections whereby the selected food product is delivered to a single outlet.

9. In a dispensing apparatus having a magazine for storing a plurality of food products in individual containers, an oven for heating said food products, and means for delivering said heated food products to an outlet, the combination comprising means for dispensing said containers singly from said magazine whereby said containers fall freely from said magazine, and catching means disposed beneath said magazine for catching said freely falling containers and then aligning them for oriented motion, said oven being disposed adjacent said catching means and having an entrance opening positioned relative to the orientation of said containers on said catching means to pass said containers into said oven from said catching means, the movement of said containers relative to said catching means and into said oven being brought about by gravity, said oven comprising an inclined heating chamber which conforms to the size and shape of said containers, said entrance opening being at the upper end of said heating chamber, and means for selectively permitting said containers to slide out of said oven through an exit opening at the lower end of said heating chamber, said oven being a microwave oven, and including entrance sealing means and exit sealing means for selectively sealing said entrance opening and said exit opening against the escape of radiation from said oven.

10. Apparatus according to claim 9 wherein said oven has a substantially plane lower wall, said exit opening being centrally disposed in said wall, said exit sealing means comprising flange means for lying against the outer surface of said wall surrounding said exit opening to seal said exit opening, first motive means for selectively withdrawing said flange means in a direction parallel to the direction of movement of said containers out of said heating chamber, second motive means for moving said flange means and said first motive means away from the path of said containers as they issue from said heating chamber, and means for selectively blocking the exit of said containers from said heating chamber until said second motive mean has moved said flange out of said path.

11. Apparatus according to claim 10, including a plunger connected to said flange means for extending part way into said heating chamber to engage the end of one of said containers to locate the same centrally within said heating chamber, said first motive means withdrawing said plunger from said chamber, said selectively blocking means comprising a spring-biased pin extending into said heating chamber and blocking said path, said pin extending outside said oven and having a flange thereon disposed in the path of said plunger when the latter is moved by said second motive means, whereby said pin is automatically withdrawn from said heating chamber after said path has been cleared by said flange means.

12. Sealing means for an opening in a substantially plane wall of a microwave oven comprising a relatively plane flange for lying against the outer surface of said wall surrounding said opening, first motive means for selectively withdrawing said flange from contact with said wall, and second motive means for moving said flange and said first motive means in a direction substantially parallel with said wall to unblock said opening.

References Cited

UNITED STATES PATENTS

| 1,127,215 | 2/1915 | Erwin et a.l | 221—116 |
| 2,363,724 | 11/1944 | Ford | 99—357 |
| 2,384,863 | 9/1945 | Warner. | |
| 2,531,238 | 11/1950 | Tandler et al. | 99—357 XR |
| 2,614,480 | 10/1952 | Elmer | 99—357 XR |
| 2,950,024 | 8/1960 | Adler. | |
| 2,990,973 | 7/1961 | Chazen | 99—357 XR |
| 3,233,536 | 2/1966 | Ignelzi | 99—357 |

BILLY J. WILHITE, Primary Examiner.

U.S. Cl. X.R.

219—10.55; 221—116, 150